United States Patent
Wan (10) Patent No.: US 12,355,332 B1
(45) Date of Patent: Jul. 8, 2025

(54) NESTED DUAL-BEARING FLAT BRUSHLESS MOTOR

(71) Applicant: Yakebi Intelligent Motor (Shenzhen) Co., Ltd., Guangdong (CN)

(72) Inventor: Xingxing Wan, Guangdong (CN)

(73) Assignee: Yakebi Intelligent Motor (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 19/095,413

(22) Filed: Mar. 31, 2025

(30) Foreign Application Priority Data

Jun. 18, 2024 (CN) .......................... 202410786601.3

(51) Int. Cl.
*H02K 7/08* (2006.01)
*F16C 35/04* (2006.01)
*H02K 5/173* (2006.01)

(52) U.S. Cl.
CPC ............. *H02K 7/088* (2013.01); *F16C 35/04* (2013.01); *H02K 5/1737* (2013.01); *F16C 2380/26* (2013.01)

(58) Field of Classification Search
CPC ...... H02K 7/088; H02K 5/1737; F16C 35/04; F16C 2380/26
See application file for complete search history.

(56) References Cited

U.S. PATENT DOCUMENTS

| | | | |
|---|---|---|---|
| 6,794,781 B2 * | 9/2004 | Razzell ................... | H02K 7/11 310/156.01 |
| 2013/0002076 A1 * | 1/2013 | Iwasaki ................ | H02K 49/102 310/103 |

FOREIGN PATENT DOCUMENTS

CN        105065462 A        11/2015

OTHER PUBLICATIONS

First Office Action received in corresponding Chinese patent application No. 202410786601.3, dated Dec. 16, 1 2024, 10 pages.

* cited by examiner

*Primary Examiner* — Terrance L Kenerly
(74) *Attorney, Agent, or Firm* — Cooper Legal Group, LLC (57) ABSTRACT

A nested dual-bearing flat brushless motor includes a first end cap, a second end cap, a connection end cap therebetween, a first connection shaft on a side of the first end cap facing the second end cap, a first connection groove on the second end cap for accommodating the first connection shaft, a second connection shaft on a side of the second end cap facing the first end cap, a second connection groove on the first end cap for accommodating the second connection shaft, a first bearing and a second bearing in the second connection groove, and a support assembly for supporting the first bearing and the second bearing, the first bearing is nested in an inner ring of the second bearing, and the second connection shaft is disposed between an outer ring of the first bearing and the inner ring of the second bearing.

8 Claims, 5 Drawing Sheets

NESTED DUAL-BEARING FLAT BRUSHLESS MOTOR

CROSS-REFERENCE TO RELATED APPLICATIONS

The present application claims the priority and benefits of Chinese patent application No. 202410786601.3, filed on Jun. 18, 2024. The entirety of Chinese patent application No. 202410786601.3 is hereby incorporated by reference herein and made a part of this specification.

FIELD OF THE INVENTION

The present application relates to a technical field of motors, and, in particular, to a nested dual-bearing flat brushless motor.

BACKGROUND OF THE INVENTION

A brushless motor is widely used in a plurality of fields because of high efficiency, long life and low maintenance cost. However, with the continuous progress of technology, performance requirements for the brushless motor in various fields are also continuously increasing. Brushless motors still face challenges in pursuing flat design, high torque output at low speeds and high precision control, especially in applications requiring precise guidance and tracking, such as high precision gimbals, where the performance requirements for the motor are even more stringent.

In order to improve load capacity of the motor, the design of dual-bearing is widely used in the motor because of its simple structure and ease of installation. However, with the continuous development of the motor technology, there are higher requirements for size and performance of the motor. A traditional dual-bearing structure has limitations in flat design of the motor, and may not satisfy requirements of modern motors on compact structures and efficient performance. At present, a method, by which the size of the bearing is reduced, is usually adopted to realize the flat design of the motor. However, this method often sacrifices stability and durability of the motor, making it difficult to achieve a flat design while maintaining the performance of the motor, which needs to be improved.

SUMMARY

In order to realize a flat design of a motor on a premise of ensuring performance of the motor, the present application provides a nested dual-bearing flat brushless motor.

The nested dual-bearing flat brushless motor provided by the present application adopts the following technical solutions.

A nested dual-bearing flat brushless motor includes a first end cap, a second end cap, a connection end cap between the first end cap and the second end cap, a first connection shaft on a side of the first end cap facing the second end cap, a first connection groove formed on the second end cap and configured for accommodating the first connection shaft, a second connection shaft on a side of the second end cap facing the first end cap, a second connection groove formed on the first end cap and configured for accommodating the second connection shaft, a first bearing and a second bearing disposed in the second connection groove, and a support assembly for supporting the first bearing and the second bearing, wherein a gap between the second connection shaft and the first connection shaft forms a first accommodating cavity for the first bearing, a gap between the second connection shaft and an inner wall of the second connection groove forms a second accommodating cavity for the second bearing, so that the first bearing is nested in an inner ring of the second bearing, and the second connection shaft is disposed between an outer ring of the first bearing and the inner ring of the second bearing.

According to the above technical solution, a nested dual-bearing manner is adopted, by which the first bearing is nested in the inner ring of the second bearing, and the first bearing and the second bearing are supported by the support assembly. When the motor starts, forces are applied to the bearings, and the forces can be cyclically transmitted through the nesting between the bearings and the effect of the support assembly, thereby reducing or eliminating the backlashes of the bearings. This design is helpful to improve the stability and performance of the system, and prolongs the service life of the bearings. In the existing technique, in order to improve the load capacity of the motor, the design of parallel double bearings is adopted, which leads to certain limitations in the flat design of the motor. In the technical solution provided in the present application, the flat design of the motor on the premise of ensuring the performance of the motor is implemented by adopting the nested dual-bearing manner.

Optionally, a fixing shaft is disposed in the first connection groove, the fixing shaft is fixedly sleeved on the first connection shaft, the support assembly includes a first support portion disposed on the fixing shaft and configured to support the first bearing, a second support portion disposed on a first side of the second connection shaft away from the first support portion and configured to support the first bearing, a third support portion disposed on a side wall of the second connection groove and configured to support the second bearing, and a fourth support portion disposed on a second side of the second connection shaft away from the third support portion and configured to support the second bearing, the first support portion and the second support portion are disposed diagonally, and the third support portion and the fourth support portion are disposed diagonally.

According to the above technical solution, the first bearing is supported by the first support portion and the second support portion, and the second bearing is supported by the third support portion and the fourth support portion. The first support portion and the second support portion are disposed diagonally, and the third support portion and the fourth support portion are disposed diagonally. Such a support assembly is designed to be capable of absorbing and dispersing impact force generated by the motor, thereby reducing damage to the entire system and making the force transmission more uniform.

Optionally, a bearing shim is sleeved on an outer ring of the second connection shaft.

According to the above technical solution, the bearing shim can bear the load and the rotating force correctly during operation. The clearance of the bearings can be finely adjusted by replacing the bearing shims of different thicknesses, so as to prevent the normal operation of the motor from being affected by axial deviation and effectively eliminate the possible backlash in the bearing installation process.

Optionally, an inner ring of the fixing shaft is in a threaded connection with an outer ring of the first connection shaft, the fixing shaft is configured with a plurality of mounting holes, and the fixing shaft is fixedly connected to an external device through self-tapping screws passing through the plurality of mounting holes.

According to the above technical solution, the inner ring of the fixing shaft has an external thread, and the outer ring of the first connection shaft has an internal thread. The fixing shaft and the first connection shaft are connected to each other through threads. The fixing shaft is configured with a plurality of mounting holes configured to connect the fixing shaft to an external device. Self-tapping screws pass through the mounting holes on the fixing shaft and cut thread on a surface of the external device for fixation, so as to ensure the stability and reliability of the motor. The self-tapping screw usually has a sharp tip, which can directly drill a hole on the surface of the material and cut the thread by itself, so that there is no need to drill in advance.

Optionally, the first connection shaft is configured with a throughhole for a cable, so that the first connection shaft is a hollow shaft.

According to the above technical solution, the first connection shaft is a hollow shaft, which means that an inner space of the first connection shaft is free, which is not solid. Such a design enables the inner space of the shaft (namely the throughhole) to be used for transmitting a signal, power, or a control signal through a wire, an electrical cable, or other wire cables, so that wiring of the cables may be more tidy and effective, and a risk of cable being damaged or entangled may be reduced.

Optionally, a rotor is further included, the side of the first end cap facing the second end cap is provided with a separation shaft, an inner ring of the separation shaft abuts against an outer ring of the second bearing, and the separation shaft and an inner cavity of the first end cap form a third accommodating cavity for the rotor.

According to the above technical solution, the separation shaft and the inner cavity of the first end cap form a third accommodating cavity for the rotor. The third accommodating cavity may be used to seat the rotor and provide a support to ensure that the rotor remains stable during operation. By placing the rotor in the third accommodating cavity and using the design of the separation shaft, it can be ensured that the rotor remains stable during operation, and friction and interference with other internal components are reduced, which improves the performance and reliability of the motor.

Optionally, the rotor includes a turntable sleeved on an outer ring of the separation shaft and a plurality of magnetic steel pieces on the turntable, and the plurality of magnetic steel pieces are uniformly distributed around a center of the turntable.

According to the above technical solution, the magnetic steel pieces are uniformly distributed on the turntable, which means that the magnetic steel pieces are distributed at the same interval around the turntable, which ensures the stability and uniformity of the magnetic field when the rotor rotates, thereby improving the performance and efficiency of the device.

Optionally, the connection end cap is configured with a first mounting groove for the first end cap and a second mounting groove for the second end cap, the first end cap is configured with a first fixing hole, the first end cap is fixedly connected to the connection end cap by a first screw passing through the first fixing hole, the second end cap is configured with a second fixing hole, and the second end cap is fixedly connected to the connection end cap by a second screw passing through the second fixing hole.

According to the above technical solution, the first end cap is fixedly connected to the connection end cap by the first screw passing through the first fixing hole, and the second end cap is fixedly connected to the connection end cap by the second screw passing through the second fixing hole. The first end cap and the second end cap are fixedly connected to the connection end cap by using the first screw and the second screw. The screw (the first screw and/or the second screw) passes through the respective fixing holes and are fixed on the connection end cap through threads, so in that the firm connection between the end caps and the connection end cap is ensured.

In summary, the present application can achieve at least one of the following beneficial effects.

1. A nested dual-bearing manner is adopted, by which the first bearing is nested in the inner ring of the second bearing, and the first bearing and the second bearing are supported by the support assembly. When the motor starts, forces are applied to the bearings, and the forces can be cyclically transmitted through the nesting between the bearings and the effect of the support assembly, thereby reducing or eliminating the backlashes of the bearings. This design is helpful to improve the stability and performance of the system, and prolongs the service life of the bearings. In the existing technique, in order to improve the load capacity of the motor, the design of parallel double bearings is adopted, which leads to certain limitations in the flat design of the motor. In the technical solution provided in the present application, the flat design of the motor on the premise of ensuring the performance of the motor is implemented by adopting the nested dual-bearing manner.

2. The first bearing is supported by the first support portion and the second support portion, and the second bearing is supported by the third support portion and the fourth support portion. The first support portion and the second support portion are disposed diagonally, and the third support portion and the fourth support portion are disposed diagonally. Such a support assembly is designed to be capable of absorbing and dispersing impact force generated by the motor, thereby reducing damage to the entire system and making the force transmission more uniform.

DETAILED DESCRIPTION

In order to make the above objects, features and advantages of the present application more apparent and easy to understand, specific embodiments of the present application are described in detail below with reference to the accompanying drawings. Many specific details are set forth in the following description to facilitate a thorough understanding of the present application. However, the present application can be implemented in many other manners different from those described herein, and those skilled in the art may make similar improvements without departing from the scope of the present application, and thus the present application is not limited by the specific embodiments disclosed below.

In the present application, unless otherwise explicitly specified and defined, terms such as "mounted", "connected", "connecting", "fixed" and the like should be understood broadly, for example, may be a fixed connection, or a detachable connection, or may be integrated; may be a mechanical connection, or an electrical connection; may be a direct connection, or may be an indirect connection through an intermediary, or may be an internal communication between two elements or an interaction relationship between two elements, unless otherwise explicitly defined. For a person of ordinary skill in the art, specific meanings of the foregoing terms in the present application may be understood according to specific situations.

In the present application, unless otherwise explicitly specified and defined, a first feature being "on" or "under" a second feature may be the first and second features being in direct contact, or the first and second features being in indirect contact through an intermediary. Also, the first feature being "over", "above", and "on" the second feature may be the first feature being directly above or obliquely above the second feature, or merely indicating that a level of the first feature is higher than that of the second feature. The first feature being "beneath", "below", and "under" the second feature may be the first feature being directly below or obliquely below the second feature, or merely indicating that a level of the first feature is less than that of the second feature.

It should be noted that when an element is referred to as being "fixed to" or "disposed on" another element, it may be directly on the other element or there may be an intermediary. When an element is considered to be "connected" to another element, it may be directly connected to the other element or there may be an intermediary at the same time. As used herein, terms "vertical", "horizontal", "upper", "lower", "left", "right", and similar expressions are for illustrative purposes only and are not meant to be the only embodiments.

The embodiment of the present application discloses a nested dual-bearing flat brushless motor.

Figure 1:
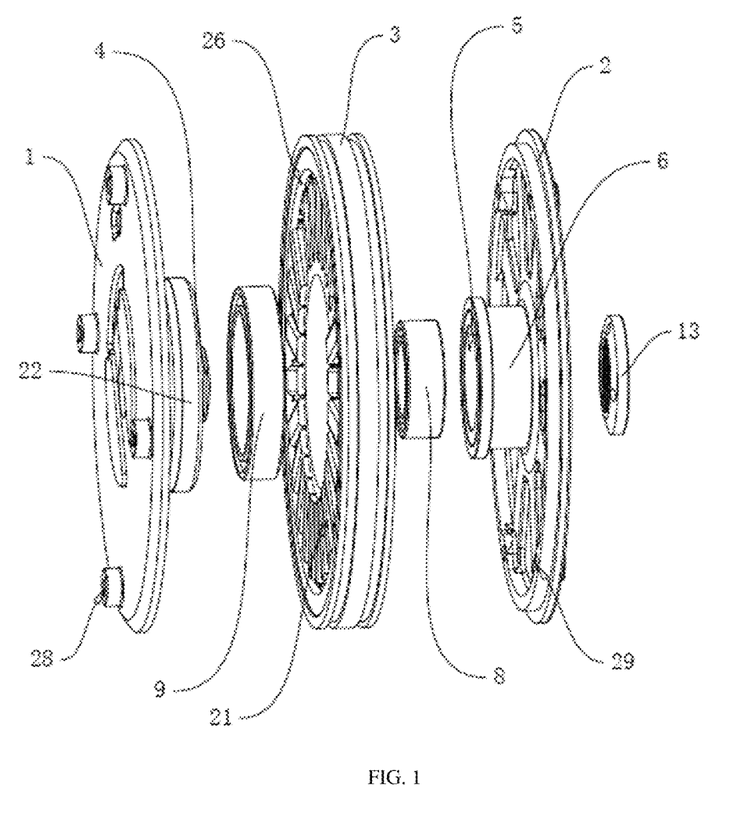
FIG. 1 is an exploded view of a first end cap and a connection end cap according to an embodiment of the present application.
Figure 2:
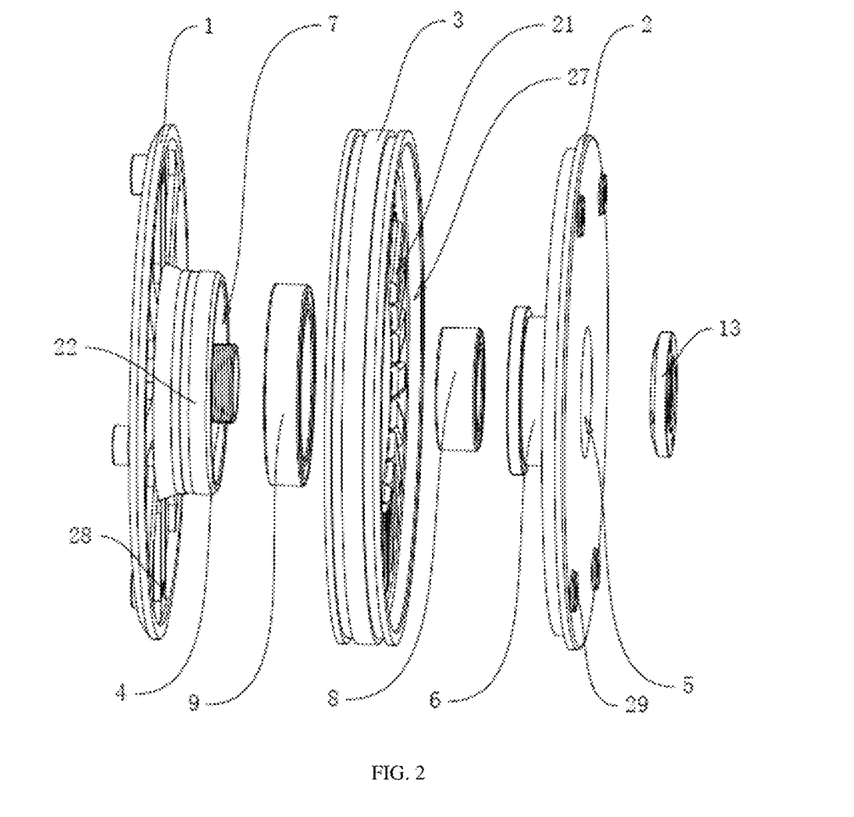
FIG. 2 is an exploded view of a second end cap and a connection end cap according to an embodiment of the present application.

Referring to FIG. 1 and FIG. 2, a nested dual-bearing flat brushless motor includes a first end cap 1, a second end cap 2, a connection end cap 3, a first connection shaft 4, a first connection groove 5, a second connection shaft 6, a second connection groove 7, a first bearing 8, a second bearing 9, and a rotor 21. The connection end cap 3 is disposed between the first end cap 1 and the second end cap 2 and is configured to connect the first end cap 1 and the second end cap 2. The connection end cap 3 is formed with a first mounting groove 26 into which the first end cap 1 is embedded and a second mounting groove 27 into which the second end cap 2 is embedded. The first end cap 1 is configured with a first fixing hole 28, and the second end cap 2 is configured with a second fixing hole 29. After the first end cap 1 is embedded into the first mounting groove 26 and the second end cap 2 is embedded into the second mounting groove 27, the first end cap 1 is fixedly connected to the connection end cap 3 by a first screw (not shown) passing through the first fixing hole 28, and the second end cap 2 is fixedly connected to the connection end cap 3 by a second screw (not shown) passing through the second fixing hole 29. The first end cap 1 and the second end cap 2 are fixedly connected to the connection end cap 3 by using the first screw and the second screw, thereby ensuring the firm connection between the end cap (the first end cap 1 and/or the second end cap 2) and the connection end cap 3. The assembly of the housing of the motor is described above, and for ease of understanding, an inner cavity structure of the motor is specifically described below.

Figure 3:
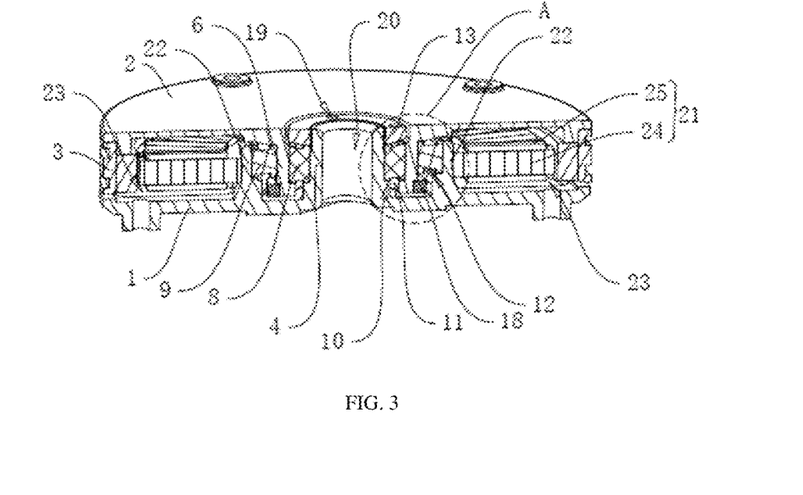
FIG. 3 is a sectional view of a brushless motor according to an embodiment of the present application.

As shown in FIG. 2 and FIG. 3, the first connection shaft 4 is fixed on a side of the first end cap 1 close to the second end cap 2, the first connection groove 5 is formed in the second end cap 2, into which the first connection shaft 4 is embedded, and the second connection shaft 6 is fixed on a side of the second end cap 2 close to the first end cap 1, the second connection groove 7 is formed in the first end cap 1, into which the second connection shaft 6 is embedded. The first bearing 8 and the second bearing 9 are disposed in the second connection groove 7. A gap between the second connection shaft 6 and the first connection shaft 4 forms a first accommodating cavity 11 into which the first bearing 8 is embedded, and a gap between the second connection shaft 6 and an inside of the second connection groove 7 forms a second accommodating cavity 12 into which the second bearing 9 is embedded, so that the first bearing 8 is nested in an inner ring of the second bearing 9. The second connection shaft 6 is disposed between an outer ring of the first bearing 8 and the inner ring of the second bearing 9 and is configured for supporting the first bearing 8 and the second bearing 9 through a support assembly 10. A separation shaft 22 is fixed on a side of the first end cap 1 close to the second end cap 2, and an inner ring of the separation shaft 22 abuts against an outer ring of the second bearing 9. An inner cavity formed by the separation shaft 22 and the first end cap 1 is configured as a third accommodating cavity 23 for placing the rotor 21. The present application provides a nested dual-bearing manner in which the first bearing 8 is nested in the inner ring of the second bearing 9, and the first bearing 8 and the second bearing 9 are supported by the support assembly 10. When the motor starts, forces are applied to the bearings (the first bearing 8 and the second bearing 9), and the forces may be cyclically transmitted through the nesting between the bearings (the first bearing 8 and the second bearing 9) and the support assembly 10, thereby reducing or eliminating backlashes of the bearings. This design helps to improve the stability and performance of the system and prolongs the service life of the bearings.

By placing the rotor 21 in the third accommodating cavity 23 and using the design of the separation shaft 22, it can be ensured that the rotor 21 remains stable during operation, and friction and interference with other internal components are reduced, which helps improve the performance and reliability of the motor. The rotor 21 includes a turntable 24 sleeved on an outer ring of the separation shaft 22 and a plurality of magnetic steel pieces 25 installed on the turntable 24. The plurality of magnetic steel pieces 25 are uniformly arranged around the center of the turntable 24, which means that the plurality of magnetic steel pieces 25 are distributed at the same interval around the turntable 24, which ensures the stability and uniformity of the magnetic field when the rotor 21 rotates, thereby improving the performance and efficiency of the device.

Figure 4:
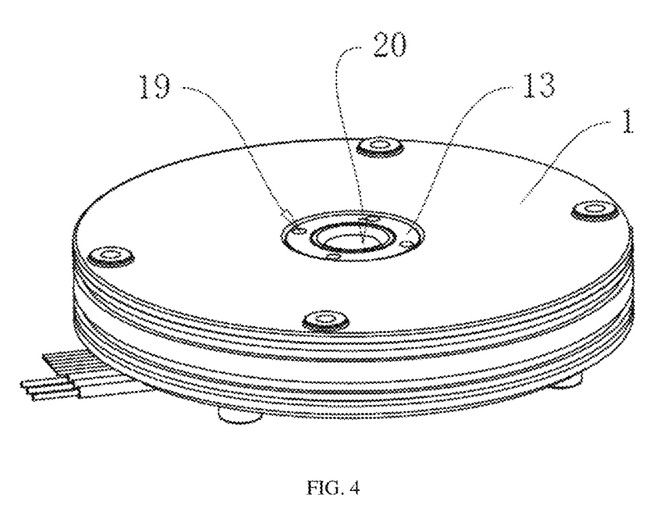
FIG. 4 is a schematic diagram of an overall structure according to an embodiment of the present application.

In an embodiment, as shown in FIG. 3 and FIG. 4, the first connection shaft 4 is configured with a throughhole 20 through which a cable passes, so that the first connection shaft 4 is a hollow shaft, which means that an inner space of the first connection shaft 4 is free. That is, the inner space is the throughhole 20 which may be used to transmit a signal, power, or a control signal through a wire, a cable, or other wire cables, so that wiring of the cables may be more tidy and effective, and a risk of cable being damaged or entangled may be reduced.

Figure 5:
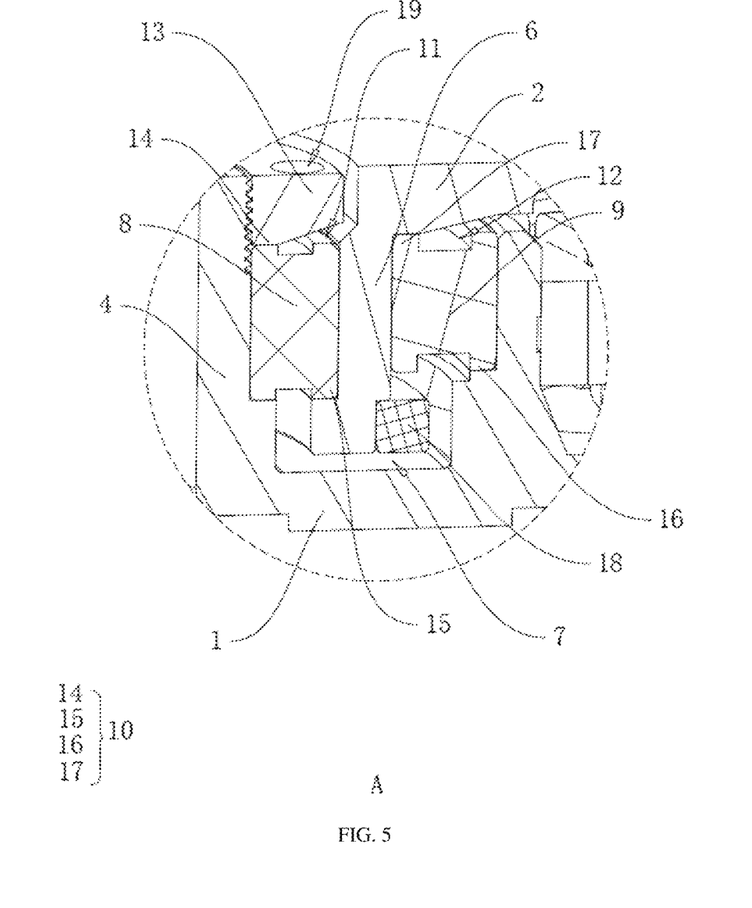
FIG. 5 is an enlarged view of a portion A in FIG. 3 according to an embodiment of the present application.

Referring to FIG. 5, a fixing shaft is provided in the first connection groove 5. The fixing shaft 13 is fixedly sleeved on the first connection shaft 4. The support assembly 10 includes a first support portion 14, a second support portion 15, a third support portion 16 and a fourth support portion 17. Specifically, the first support portion 14 is fixed on the fixing shaft 13 and is configured to support the first bearing 8, the second support portion 15 is fixed on a side of the second connection shaft 6 away from the first support portion 14 and is configured to support the first bearing 8, the third support portion 16 is fixed on a side wall of the second connection groove 7 and is configured to support the second bearing 9, and the fourth support portion 17 is fixed on a side of the second connection shaft 6 away from the third support portion 16 and is configured to support the second bearing 9. The first bearing 8 is supported by the first support portion 14 and the second support portion 15, and the second bearing 9 is supported by the third support portion 16 and the fourth support portion 17. The first support portion 14 and the second support portion 15 are disposed diagonally, and the third support portion 16 and the fourth support portion 17 are disposed diagonally. The support assembly 10 is designed to be capable of absorbing and dispersing impact force generated by the motor, thereby reducing damage to the entire system and making the force transmission more uniform.

In order to further ensure the stability of the normal operation and performance of the motor, an outer ring of the second connection shaft 6 is equipped with a bearing shim 18. The bearing shim 18 can bear the load and the rotating force correctly during operation. The clearance of the bearings can be finely adjusted by replacing the bearing shims 18 of different thicknesses, so as to prevent the normal operation of the motor from being affected by axial deviation and effectively eliminate the possible backlash in the bearing installation process.

Referring to FIG. 4 and FIG. 5, an inner ring of the fixing shaft 13 is in threaded connection with the outer ring of the first connection shaft 4. That is, the inner ring of the fixing shaft 13 has an external thread, and the outer ring of the first connection shaft 4 has an internal thread. The fixing shaft 13 and the first connection shaft 4 are connected to each other through threads. The fixing shaft 13 is configured with a plurality of mounting holes 19 configured to connect the fixing shaft 13 to an external device. Self-tapping screws (not shown) pass through the mounting holes 19 on the fixing shaft 13 and cut thread on a surface of the external device for fixation, so as to ensure the stability and reliability of the motor. The self-tapping screw usually has a sharp tip, which can directly drill a hole on the surface of the material and cut thread by itself, so that there is no need to drill in advance.

An implementation principle of the nested dual-bearing flat brushless motor according to the present application is as follows. A nested dual-bearing manner is adopted, by which the first bearing 8 is nested in the inner ring of the second bearing 9, and the first bearing 8 and the second bearing 9 are supported by the support assembly 10. When the motor starts, forces are applied to the bearings, and the forces can be cyclically transmitted through the nesting between the bearings and the effect of the support assembly 10, thereby reducing or eliminating the backlashes of the bearings. This design is helpful to improve the stability and performance of the system, and prolongs the service life of the bearings. In the existing technique, in order to improve the load capacity of the motor, the design of parallel double bearings leads to certain limitations in the flat design of the motor. In the technical solution provided in the present application, the flat design of the motor on the premise of ensuring the performance of the motor is implemented by adopting the nested dual-bearing manner.

The above are preferred embodiments of the present application and are not intended to limit the protection scope of the present application, and thus all equivalent changes made according to the structure, shape and principle of the present application shall fall within the protection scope of the present application.

LISTING OF REFERENCE SIGNS 1 first end cap
2 second end cap
3 connection end cap
4 first connection shaft
5 first connection groove
6 second connection shaft
7 second connection groove
8 first bearing
9 second bearing
10 support assembly
11 first accommodating cavity
12 second accommodating cavity
13 fixing shaft
14 first support portion
15 second support portion
16 third support portion
17 fourth support portion
18 bearing shim
19 mounting hole
20 throughhole
21 rotor
22 separation shaft
23 third accommodating cavity
24 turntable
25 magnetic steel piece
26 first mounting groove
27 second mounting groove
28 first fixing hole
29 second fixing hole

What is claimed is:

1. A nested dual-bearing flat brushless motor, comprising a first end cap, a second end cap, a connection end cap between the first end cap and the second end cap, a first connection shaft on a side of the first end cap facing the second end cap, a first connection groove formed on the second end cap and configured for accommodating the first connection shaft, a second connection shaft on a side of the second end cap facing the first end cap, a second connection groove formed on the first end cap and configured for accommodating the second connection shaft, a first bearing and a second bearing disposed in the second connection groove, and a support assembly for supporting the first bearing and the second bearing, wherein a gap between the second connection shaft and the first connection shaft forms a first accommodating cavity for the first bearing, a gap between the second connection shaft and an inner wall of the second connection groove forms a second accommodating cavity for the second bearing, so that the first bearing is nested in an inner ring of the second bearing, and the second connection shaft is disposed between an outer ring of the first bearing and the inner ring of the second bearing.

2. The nested dual-bearing flat brushless motor according to claim 1, wherein a fixing shaft is disposed in the first connection groove, the fixing shaft is fixedly sleeved on the first connection shaft, the support assembly comprises a first support portion disposed on the fixing shaft and configured to support the first bearing, a second support portion disposed on a first side of the second connection shaft away from the first support portion and configured to support the first bearing, a third support portion disposed on a side wall of the second connection groove and configured to support the second bearing, and a fourth support portion disposed on a second side of the second connection shaft away from the third support portion and configured to support the second bearing, the first support portion and the second support portion are disposed diagonally, and the third support portion and the fourth support portion are disposed diagonally.

3. The nested dual-bearing flat brushless motor according to claim 1, wherein a bearing shim is sleeved on an outer ring of the second connection shaft.

4. The nested dual-bearing flat brushless motor according to claim 2, wherein an inner ring of the fixing shaft is in a threaded connection with an outer ring of the first connection shaft, the fixing shaft is configured with a plurality of mounting holes, and the fixing shaft is fixedly connected to an external device through self-tapping screws passing through the plurality of mounting holes.

5. The nested dual-bearing flat brushless motor according to claim 1, wherein the first connection shaft is configured with a throughhole for a cable, so that the first connection shaft is a hollow shaft.

6. The nested dual-bearing flat brushless motor according to claim 1, further comprising a rotor, wherein the side of the first end cap facing the second end cap is provided with a separation shaft, an inner ring of the separation shaft abuts against an outer ring of the second bearing, and the separation shaft and an inner cavity of the first end cap form a third accommodating cavity for the rotor.

7. The nested dual-bearing flat brushless motor according to claim 6, wherein the rotor comprises a turntable sleeved on an outer ring of the separation shaft and a plurality of magnetic steel pieces on the turntable, and the plurality of magnetic steel pieces are uniformly distributed around a center of the turntable.

8. The nested dual-bearing flat brushless motor according to claim 1, wherein the connection end cap is configured with a first mounting groove for the first end cap and a second mounting groove for the second end cap, the first end cap is configured with a first fixing hole, the first end cap is fixedly connected to the connection end cap by a first screw passing through the first fixing hole, the second end cap is configured with a second fixing hole, and the second end cap is fixedly connected to the connection end cap by a second screw passing through the second fixing hole.

* * * * *